R. B. & J. R. PARKS.
Machine for Measuring Tires for Wheels.

No. 214,001. Patented April 8, 1879.

Attest:
Charles H. Schoff
S. S. Schoff

INVENTORS:
Robert B. Parks
John R. Parks
By Coyne & Co. his
Attorneys.

UNITED STATES PATENT OFFICE.

ROBERT B. PARKS AND JOHN R. PARKS, OF PRINCETON, ILLINOIS.

IMPROVEMENT IN MACHINES FOR MEASURING TIRES FOR WHEELS.

Specification forming part of Letters Patent No. 214,001, dated April 8, 1879; application filed August 17, 1878.

*To all whom it may concern:*

Be it known that we, ROBERT B. PARKS and JOHN R. PARKS, both of Princeton, in the county of Bureau and State of Illinois, have jointly invented certain new and useful Improvements in Machines for Measuring Tires for Wheels, of which the following, in connection with the accompanying drawings, forming a part hereof, is a specification.

Figure 1:
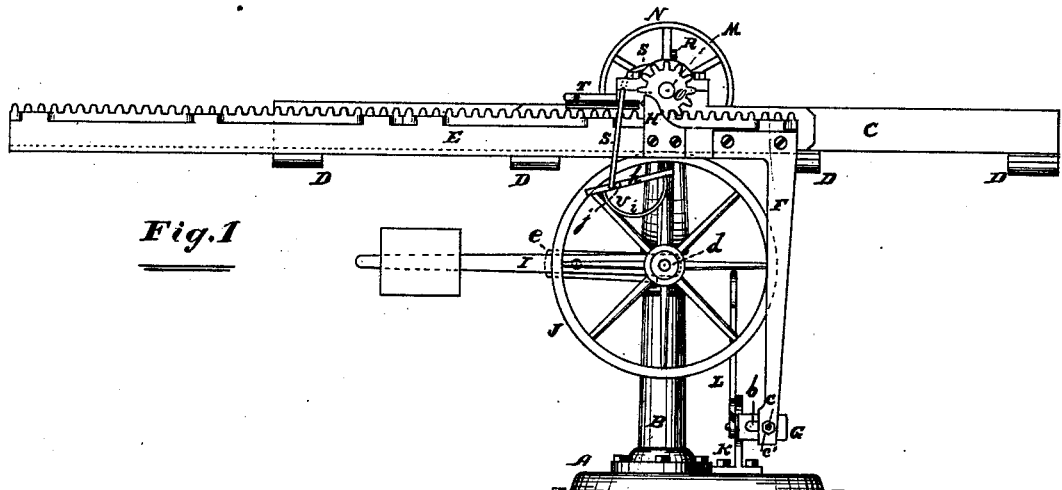
Figure 2:
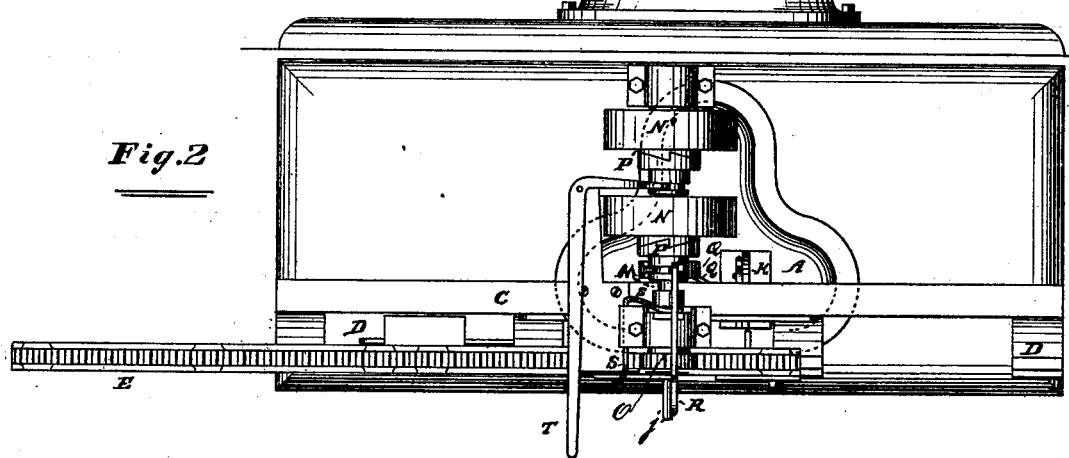
Figure 3:
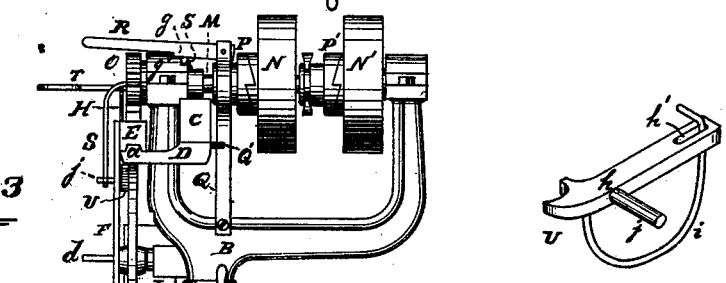
Figure 4:
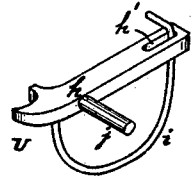

In the drawings, Figure 1 is a side elevation of a machine embodying our invention; Fig. 2, a top or plan view thereof; Fig. 3, an end view; and Fig. 4, a perspective of the automatic stop device.

Like letters of reference indicate like parts.

The object of our invention is to make a machine whereby tires for wheels may be easily and accurately measured, or the length required for any wheel ascertained with certainty and with facility.

In the drawings, A represents the base of the machine, and B a standard, on which the frame is mounted. C is a horizontal bar, forming a part of the frame. D D are brackets or supports extending laterally from the bar C, and each having on their upper faces a rib, $a$. E is a traveling rack, grooved on its lower face to ride back and forth on the ribs $a\ a$. F is an arm extending vertically downward from the forward end of the rack E, and G is an angular plate having therein the horizontal slot $b$, and connected to the lower end of the arm F, adjustably, by means of a bolt and nut, the bolt passing through the said slot and arm, and the parts being clamped together by means of the nut, the bolt being headed to admit of that result. $c$ represents the bolt, and $c'$ the nut; but any suitable clamping device may be employed to connect the plate G adjustably to the arm F. It is not absolutely essential, though preferable, as will hereinafter appear, that the plate G should be adjustable.

H is a stop or catch on the rack E. I is a weighted arm or lever, provided at one end with a spindle or journal, $d$, and pivoted to a supporting-arm, $e$, at a point between the spindle and the weighted end, so that the end provided with the spindle will be held up when the wheel to be tired is mounted on the spindle. J represents the wheel, the felly of which, as will be perceived, is held against the lower face of the rack E, so that the perimeter of the wheel will measure itself on the rack as the latter is moved back and forth. In other words, when the rack is moved forward sufficiently to rotate the wheel once around, the plate G will be carried forward a distance equal to the circumference of the wheel.

K is a vertical plate on the base A. This plate is shouldered, as shown at $a'$, and the upper or horizontal edge of this shoulder constitutes a cutting-blade, forming a part of the shears employed for cutting the tire-iron after the length of the tire is ascertained. L is an angular lever pivoted to the plate K, and the short arm of this lever operates as a movable blade in severing the tire-iron. This shear K L is so arranged that the inwardly-projecting arm of the plate G will pass directly in front of it during the movement of the rack E.

It will be perceived that if the shear and the inwardly-projecting arm of the plate G stand in the same vertical plane, the said arm will move forward from the shear a distance equal to the circumference of the wheel J, when the latter is rotated once by the forward movement of the rack E. In other words, its distance from the shear will then be equal to the length of the tire to be used on the wheel, provided the tire should be cut so as fit the wheel. The tire, however, should be a little shorter than this, unless it be made sufficiently short by being welded together. We therefore deem it preferable to make the inwardly-extending arm of the plate G adjustable, in the manner described, so that it may be so set, with relation to the shear, as to be moved forward therefrom a distance equal to the proper length of the tire-iron during one rotation of the wheel by the forward movement of the rack, considering the length of lap in welding and the degree to which the diameter of the wheel should exceed that of the tire. If these parts be so set with relation to each other, and the wheel be once rotated in the manner described, it is evident that the inwardly-extending arm of the plate G will stand such a distance from the shear that the tire-iron will be cut off the desired length if one end be placed against the said arm, and the iron be then cut by the shear. The iron, however, may be thus marked only. In other words, the arm F may, with propriety, be termed a "traveling gage," and it is immaterial whether the plate G be adjustable or not, except for the purpose set forth, for, whether adjustable or not, the arm and plate always travel the same distance together, and the end of the tire-iron may be set against the arm F, as well as against the plate G, to determine the proper length of the tire. However, by applying an adjustable part to the arm F, exact allowance may be made for lap and for diminishing the diameter of the tire with relation to that of the wheel, so that a tight fit may be effected; and therefore we deem the use of an adjustable plate, G, preferable, so that, this allowance once ascertained, the tire-iron will thereafter be automatically measured, or the length of tire gaged without further calculation while tires for wheels of the same size are to be made.

M is the driving-shaft, and N and N' are driving-wheels mounted loosely thereon. O is a pinion on the shaft M, and engaging the rack E, the pinion being rigid on its shaft. P and P' are clutches carried by the shaft M. The clutch P is adapted to engage the hub of the wheel N, and the clutch P' the hub of the wheel N', the adjacent edges or faces of the hubs and clutches being serrated for that purpose. The wheel N, however, is intended to be driven in one direction, for example, so that, when engaged by the clutch P', the rack E will be moved forward; and the wheel N' is to be driven in the opposite direction when engaged by the clutch P', so that the rack E will be thereby drawn backward, the serrations on the hubs and clutches being made to admit of this result, as represented in Figs. 2 and 3, and it being understood that the clutches are mounted on a rib on the driving-shaft and entering a groove in the clutches, so that the latter may be moved to and from engagement with the driving-wheels N and N' during the rotation of the shaft.

Q is an arm or lever, pivoted to the standard B, or to the frame of the machine. The upper or free end of this arm carries a pin which enters a groove in the perimeter of the clutch P; and Q' is a spring for carrying the arm Q and the clutch P from the wheel N.

R is an arm or lever, pivoted to the upper end of the arm or lever Q, and arranged horizontally, as shown. A small shoulder, $g$, is made on the arm R, and $g'$ is a shoulder made on the frame, and arranged to engage the shoulder $g$ and to hold the clutch P to the wheel N during such engagement.

S is a trip device, one arm of which extends underneath the arm R, and the other end of which extends downward below the felly of the wheel J. T is a bent lever, one arm of which engages the clutch P', and the other of which is arranged to be struck by the stop H during the rearward movement of the rack E, the said lever being pivoted at its angle to the frame of the machine.

U is a stop device intended to be removably applied to any wheel J, and to operate in connection with the trip device S for stopping the rotation of the wheel by the forward movement of the rack E as soon as a complete rotation is made. The stop device U consists of the bar $h$, of such a length as to about equal the greatest distance between any two consecutive spokes in wheels of ordinary size. One end of the bar $h$ is notched to receive a spoke, and the other end is slotted, as shown at $h'$. A spring, $i$, is attached to the notched end of the bar $h$, bowed downward, and passed through the slot $h'$, and the free end of this spring is bent, as shown, to bear against a spoke. The slot $h'$ is long enough to allow the bent end of the spring $i$ to be moved back and forth therein, or, in other words, to allow the spring to exert its pressure against the spoke in contact therewith. A trip-pin, $j$, extends laterally from the bar $h$. By this means nicety of construction is avoided in rendering the device U attachable to a wheel, J, and it may readily be adjusted between different spokes or to different wheels. A platform for supporting the tire-iron may be used.

In order to use this machine for the purpose for which it is intended the plate G should be set as already described with relation to the shear. The clutch P' should be drawn from engagement with the hub of the wheel N', and the stop H should then rest against the forward side of the handle of the lever T. The wheel J should then be mounted in its place, and the stop device U should be so applied to the wheel that the pin $j$ will project outward. This wheel should be moved from contact with the rack E, and so turned as to bring the pin $j$ against the forward side of the pendent arm of the trip-lever S when the said arm is at the end of its rearward movement. The arrangement of the parts is such that all may occupy the positions described at the same time. To set the machine in action the clutch P is pushed in to engage the hub of the wheel N, and this is done by grasping the arm R and pushing it toward the clutch, thus actuating the lever Q, and thereby moving the clutch in the proper direction. As soon as the clutch engages the wheel the outer end of the arm R must be depressed, so that the shoulders $g$ and $g'$ will be interlocked. The action of the spring Q' will thus be overcome, and the clutch P locked to its engagement with the hub of the wheel N. The arm R now rests upon the upper end of the lever S. The engagement of the wheel N and clutch P with each other causes the rack E to move forward, and the plate G is thus carried from the shear. The forward movement of the rack also causes the wheel J to be rotated and to measure itself upon the rack, and this rotation is in such a direction that the pin $j$ is carried from the pendent arm of the lever S. The continued rotation of the wheel J, however, carries the pin $j$ up behind and against the pendent arm of the lever S, and carries the latter forward until the consequent up movement of the upper or horizontal arm of that lever lifts the arm R sufficiently to carry the shoulder $g$ from the shoulder $g'$, thus releasing that arm and allowing the spring $Q'$ to act on the lever Q, by which action the clutch P is carried from the hub of the wheel N, and the rotation of the wheel J is thereby made to cease at the time it has made one rotation. The plate G now stands at such a distance from the shear that the tire iron may be measured and cut in the manner already described. The lever T should now be moved in such a direction as to throw the clutch P' into engagement with the hub of the wheel N'. This engagement, for the reasons already stated, causes a reverse movement of the rack E and of the parts actuated thereby, and the stop or catch H is thus carried back against the forward part or side of the lever T, and moves that lever until the engagement of the clutch P' and the wheel N' is released, and the rearward or reverse movement of the parts thereby stopped. By this time all the parts have returned to their original position, and another forward movement of plate G may then be caused in the manner described, with the result already set forth.

It will be perceived from the foregoing description that the wheel J forms no part of the machine, but is a wheel to be tired, and that the machine, by being provided with an adjustable spindle, $d$, extending therefrom sufficiently to receive the wheel, is adapted to receive wheels of different sizes, which, when mounted on the spindle, controls the action of the machine according to the size of the wheel so mounted, it being remembered that stop mechanism is employed to limit the rotation of the wheel to one rotation.

The machine is simple in its construction and operation, and performs its work with accuracy.

It will be perceived that the distance moved by the plate G in both directions is automatically controlled, and that the extent of movement is regulated by the wheel to be tired.

Although we here claim some of the minor or subordinate features of our invention, we do not intend to be restricted either to the construction of shear herein shown and described, or to a counter-weighted spindle or axle for receiving the wheel to be tired, or to the driving-gearing herein particularly specified, as other well-known or suitable means may be employed in their stead and for the same purpose without exceeding the scope of our invention; but,

Having thus described our invention, what we claim as new, and desire to secure by Letters Patent, is—

1. The combination, substantially as described, in a tire-measuring machine, of a traveling bar carrying a gage-arm, F, and of an adjustable spindle, $d$, the latter adapted and arranged for receiving and holding against the said bar, one after another, the fellies of wheels of different sizes, all operating together, in connection with stop mechanism for limiting the movement of the said traveling bar, for the purposes set forth.

2. The traveling removable stop device U, consisting of the combination of the bar $h$, carrying the tripping-pin $j$, and the spring $i$, the said pin extending laterally from the said bar, and the said bar being notched at one end and slotted near the other, substantially as and for the purposes specified.

3. The combination, substantially as described, in a tire-measuring machine, of a traveling bar carrying the downwardly-extending arm F, the spindle or axle $d$, adapted and arranged to hold a gage-wheel against the said traveling part, and a shear, all arranged, substantially as specified with relation to each other, for the purposes set forth.

4. The combination, in a tire measuring and cutting machine, of the traveling rack E, carrying the arm F, the latter provided with the adjustable plate G, the yielding spindle or axle $d$, adapted and arranged to hold a gage-wheel against the said traveling part, and a fixed shear, substantially as and for the purposes specified.

5. The combination, in a tire-measuring machine wherein a traveling bar is employed, in connection with a spindle or axle for holding against the said bar the wheel to be tired, of the trip-lever S, the tripping-pin $j$, adapted for being removably applied to the said wheel, and a catch or fastening for holding the starting-lever in position for causing the forward movement of the said bar, substantially as and for the purposes specified.

6. The combination, in a tire-measuring machine wherein a traveling bar is employed, with a spindle or axle for holding against the said bar, one after another, the wheels to be tired, of the stop-projection H, mounted on the said bar, the levers T and Q, the arm or lever R, the trip-lever S, and the traveling tripping-pin $j$, in connection with clutches and driving-wheels on the driving-shaft, substantially as and for the purposes specified.

7. The combination of the driving-shaft M, loose serrated wheels N and N', rotary, laterally-sliding, and serrated clutches P and P', pinion O, levers Q and T, spring Q', shouldered arm or catch R, shoulder $g'$, trip-arm S, pin $j$, spindle $d$, a gage-wheel, rack E, carrying the arm F and stop H, and the shear, substantially as and for the purposes specified.

ROBERT B. PARKS.
JOHN R. PARKS.

Witnesses:
JAMES H. ELLIS,
CHARLES B. RICHMOND.